Patented Dec. 14, 1948

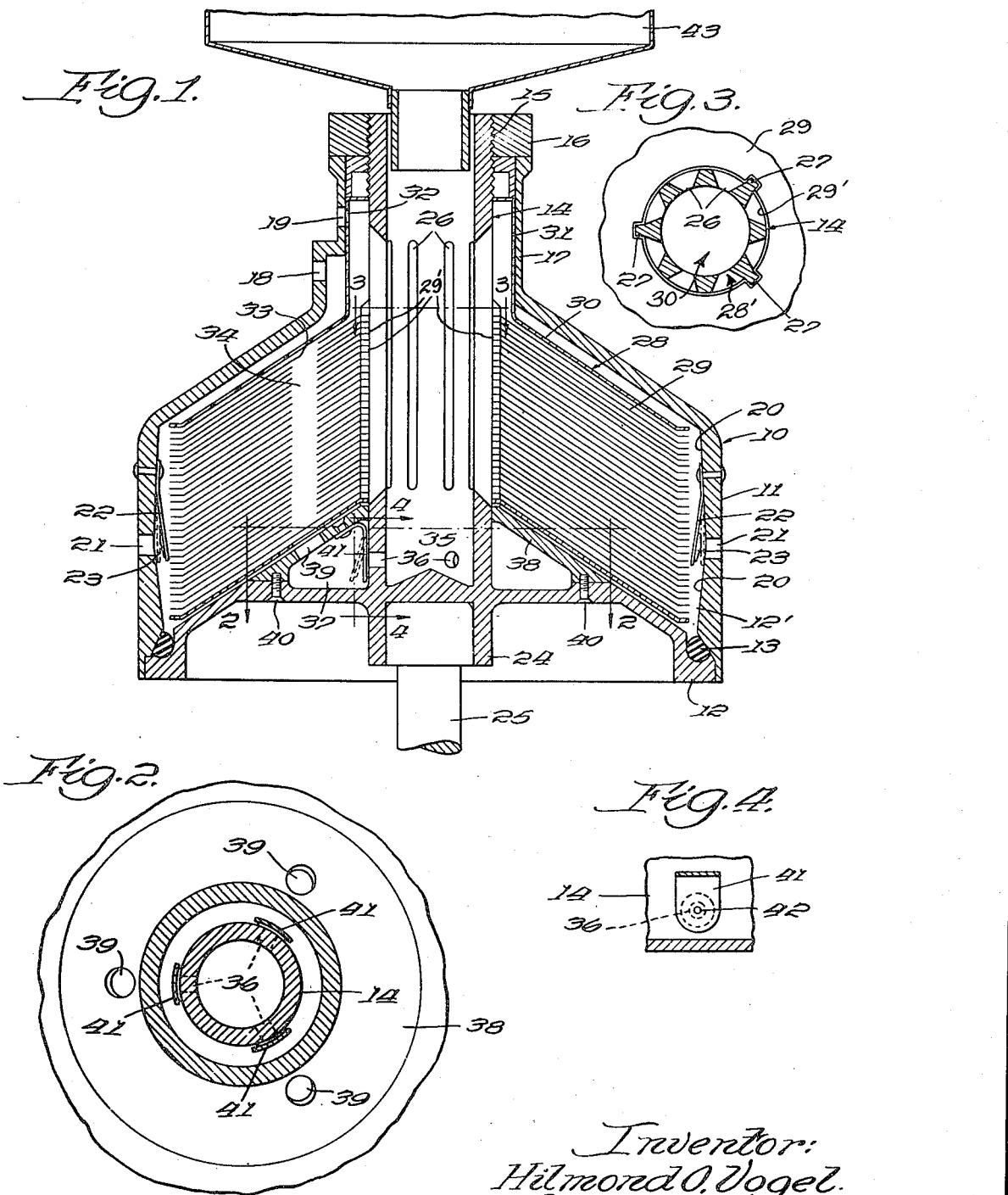

2,456,347

UNITED STATES PATENT OFFICE 2,456,347

CENTRIFUGAL SEPARATOR

Hilmond O. Vogel, Chicago, Ill., assignor to International Harvester Company, a corporation of New Jersey Application June 24, 1946, Serial No. 678,840

9 Claims. (Cl. 233—1)

This invention relates to a centrifugal separator, and more particularly it relates to an improved cream separating bowl.

More specifically, this invention relates to an improved type of self-washing cream separating bowl. In order to overcome the hardships of washing cream separating bowls and separating disks by hand, self-washing cream separating bowls have been designed. Bowls of this kind generally are constructed with centrifugally operable flushing valves at their periphery. After the separating operation, washing liquid is introduced into a distributor tube axially positioned within the bowl, and this washing liquid follows the same path as the whole milk to be separated. The centrifugal rotation of the separating bowl causes the washing liquid to be radially distributed at the center openings of the separating disks and between the surfaces of said disks to thoroughly wash and clean them. This operation is generally accompanied by a lowering of the rotating speed of the bowl, whereby the centrifugal outlet valves located at the periphery of the bowl are free to open and thus permit the washing liquid to be flushed from the interior of the bowl.

In order to secure an even distribution of the washing liquid, applicant has designed an improved bowl which is provided with a distributor tube having openings and valve means for controlling the discharge of washing liquid throughout the inner peripheries of the disks. Since a major portion of the washing liquid supplied to the separating bowl generally follows the normal path taken by the whole milk to be separated, it is difficult to build up a sufficient column of washing liquid within the distributor tube to provide for adequate washing of the inner peripheries of the separating disks. Excessive quantities of washing liquid thus would have to be used to secure the complete washing desired. It is applicant's prime object to overcome this difficulty by providing an automatic valve means which is operable to control the course of washing liquid supplied to the separating bowl, thereby providing even and complete distribution of washing water to all parts of the bowl.

It is another object to provide a centrifugally operable valve means for controlling the distribution of washing liquids of a self-washing type of separating bowl.

It is still another object to provide a distributor for a separating bowl, said distributor having centrifugal valve means operable to control the distribution of washing liquid and whole milk to be separated from said distributor.

It is a further object to provide a spring-controlled valve means for an axially positioned distributor of a self-washing type of cream separating bowl.

It is still a further object to provide a self-washing type of separating bowl having centrifugally operable valves to control the feeding of washing liquid to the bowl and to regulate its discharge from said bowl.

These and other objects will become more apparent upon a reading of the annexed specification in conjunction with the accompanying drawing in which:

Figure 1 is a cross-sectional view in elevation of a self-washing type of cream separating bowl;

Figure 2 is a sectional view taken along the sectional line 2—2 of Figure 1;

Figure 3 is a sectional view taken along the sectional line 3—3 of Figure 1; and Figure 4 is a sectional view taken along the sectional line 4—4 of Figure 1, showing a centrifugal valve means embodying elements of this invention.

Referring to the drawings and more particularly to Figure 1, a cream separating bowl is generally designated by the reference character 10 and includes an upper shell portion 11 and a lower base portion 12. The upper shell portion 11 and the lower base portion 12 form a chamber 12' which is sealed by a sealing ring 13. A distributor tube 14 is centrally formed in the base member 12, said distributor tube extending upwardly therefrom and being provided with a threaded portion 15 to which is threaded a collar member 16. The collar member 16 is in connecting relation with a neck portion 17 of the upper shell portion 11. The clamping connection between said distributor tube 14 and the neck portion 17 is such as to adequately seal the chamber 12 of the separating bowl 10. A skim milk outlet 18 and a cream outlet 19 are formed in the neck portion 17.

The interior of the separating bowl 10 is provided with a pair of sloping surfaces 20 converging at a maximum internal periphery. A plurality of discharge ports 21 are formed at this maximum internal periphery. The number of these ports may vary according to certain washing conditions, it being sufficient to illustrate two of these in the present invention. A centrifugally operable port valve 22 having sealing portions 23 is provided for each port. The port valves 22 may consist of any suitable resilient material, the present valve indicated being a metallic leaf spring suitably connected to the shell portion.

The base member 12 is provided with a downwardly extending portion 24 which is securely keyed to a driving member 25. The driving member 25 generally is connected to the shaft of a power actuating means (not shown) such as an electric motor or a manually cranking mechanism. The upwardly extending distributor tube 14 is provided with a plurality of axially extending and circumferentially spaced openings or outlets 26. As indicated in Figure 3, three evenly spaced axially extending projections 27 are formed on the distributor tube 14. These projections serve to support a disk pack 28 consisting of a plurality of superposed frusto-conical separating disks 29. The disks 29 include centrally located openings 28' having inner peripheral edges 29' which are in alignment to form a substantially cylindrical space 30'. The distributor tube 14 is positioned in this space 30' and is formed integrally with the bowl for rotation therewith. A closure disk 30 is positioned at the top of the disk pack 28, said closure disk consisting of a neck portion 31 having a cream outlet opening 32 registering with the outlet opening 19. Each disk 29 is provided with a plurality of eccentric holes 33 in axial alinement to form eccentric passages 34.

Positioned at the lower end of the distributor 14 is a distributing chamber 35. The distributing chamber 35 is provided with a plurality of discharge outlets 36 in communication with a secondary distributing chamber 37. The distributing chamber 37 is closed at its top with a removable conical closure member 38 having openings 39, only one of which is shown, in communication with the passages 34. The closure member 38 is connected to the base portion 12 by means of set-screws 40. Discharge through the openings 36 is regulated by means of centrifugally operable spring valves 41 as best indicated in Figures 1, 2, and 4. The spring valves 41 are connected to the closure member 38 and are provided with metering openings 42.

In operation, whole milk to be separated is supplied to the separating bowl 10 from a supply can 43. At this point the separating bowl has attained an operating speed somewhere around 10,000 R. P. M. During this high-speed rotation the port valves 22 are held by the centrifugal force in sealing engagement with the ports 21. The centrifugally operable spring valves 41 are held away from the openings 36 due to the high centrifugal force, and therefore the openings 36 are free to permit an unrestricted flow of whole milk into the secondary distributing chamber 37 and subsequently to the disk pack where separation is effected. Discharge of the skim milk and cream is accomplished in the conventional manner through the outlets 18 and 19. Since the openings 36 are substantially unrestricted, the major portion of the whole milk supplied to the bowl will pass through the secondary chamber 37 and into the disk pack, a relatively small amount of whole milk being distributed through the openings 26.

After the separating operation the motor or driving means is shut off. A small quantity of washing liquid is supplied to the bowl to flush any remaining cream therefrom. When the speed of rotation of the bowl has become sufficiently low, somewhere around 6,000 R. P. M., washing liquid is supplied to the bowl 10 from the supply can 43. The entrance of the washing liquid and the force necessary to bring this liquid into rotation further slows down the bowl. At a predetermined low speed the port valves 22 will be sufficiently resilient to overcome the centrifugal force and will open. The driving means is then placed into operation again and washing liquid is flushed through the port valves which remain open during the washing operation.

Due to the lowered speed of rotation and consequent lessening of centrifugal force, the spring valves 41 exert sufficient pressure to close and substantially seal the openings 36 thereby blocking the flow of liquid through the chamber. The washing liquid builds up in the distributing chamber 35 and a limited portion thereof is metered through the metering openings 42 to provide a sufficient flushing of the interior of the secondary chamber 37. A column of liquid continues to build up within the distributor tube 14, and due to this build up washing water is radially distributed through the openings 26 throughout the inner peripheries of the disks and between them, thereby effecting a complete and thorough washing of all the surfaces of said disks. Thus the prime function of the valves 41 is to regulate the quantity of washing liquid escaping through the openings 36, this control being necessary to assure a complete and sufficient distribution to the place where washing is most needed, namely, the separating disks. The resiliency of the port valves may be adjusted by changing the stiffness or material of the leaf springs to which they are attached. Likewise, the centrifugally operable spring valves 41 may be manufactured of a spring-like material that will react to the centrifugal force at a predetermined speed of rotation of the bowl. For this reason it is apparent that both types of valves may be constructed and arranged so that the port valves 22 will close and the spring valves 41 will open simultaneously. On the other hand, it might be desired that the port valves react first at one speed of rotation and that the spring valves react at another different speed. The reaction of the spring valves therefore can, but need not necessarily be simultaneous, it only being necessary that both sets of valves be in their respective positions when either the separating or washing operation begins. The valves thus can be constructed to open at a speed which is previously determined depending on the speed of rotation at which the operator intends to separate or wash.

It can thus be seen and readily understood that the objects of the invention have been fully achieved and that an automatically operable centrifugal valve means has been provided to control the quantity and path of travel of washing liquid, thereby providing for the distribution of a sufficient amount of washing liquid where it is most required. Thus by the use of a small quantity of washing water an effective, complete and speedy washing is obtained.

It must be understood that various modifications and changes in this construction may be made without departing from the spirit of the invention nor the scope thereof as defined in the appended claims.

What is claimed is:

1. A centrifugal separator, comprising in combination, a revoluble separating bowl, means for driving said bowl, a plurality of discharge ports formed in the periphery of said bowl, port valves operable to open and close said ports, a pack of frusto-conical disks disposed within said bowl in spaced superposed relationship and having center holes in axial alinement to form a cylindrical space, a distributor tube projecting into said space, a plurality of circumferentially spaced and vertically extending outlets formed in said distributor tube, means for supplying liquid to be separated and washing liquid to said distributor tube, a distributor chamber formed at the lower end of said distributor tube, said chamber having a plurality of openings in communication with said disk pack, and spring operable valve means associated with said openings for regulating the discharge therethrough, said spring valves being centrifugally operable to open and close said openings and adapted to block the flow of liquid through said distributor chamber thereby diverting the liquid flow through the outlets of said distributor tube.

2. A centrifugal separator comprising in combination, a revoluble separating bowl, means for driving said bowl, a plurality of discharge ports formed in the periphery of said bowl, centrifugal port valves operable to open and close said ports, a pack of frusto-conical disks disposed within said bowl, said disks being provided with center holes and eccentric openings in axial alinement, said center holes providing a cylindrical space, a distributor tube positioned within said space, openings formed in said distributor tube for supplying washing liquid throughout the inner peripheries of said disks, means for supplying washing liquid to said distributor tube, a distributor chamber formed in said distributor tube, said chamber having a plurality of openings in communication with said eccentric openings, and valve means centrifugally operable to open said openings during the separating operation, and to close said openings during the washing operation, thereby blocking the flow of liquid from said chamber and diverting washing liquid through the openings in the distributor tube.

3. A centrifugal separator comprising in combination, a revoluble separating bowl, means for driving said bowl, a plurality of discharge ports formed in the periphery of said bowl, centrifugal port valves operable to open and close said ports, a pack of frusto-conical disks disposed within said bowl, said disks being provided with center holes and eccentric openings in axial alinement, said center holes providing a cylindrical space, a distributor tube positioned within said space, openings formed in said distributor tube for supplying washing liquid throughout the inner peripheries of said disks, means for supplying washing liquid and fluid to be separated to said distributor tube, a distributor chamber formed in the lower end of said distributor tube, said chamber having a plurality of openings in communication with said eccentric openings, and centrifugal valve means for said openings, said centrifugal valve means being operable by centrifugal force to regulate said openings of said distributor chamber and to block the flow of liquid from said distributor chamber thereby diverting the liquid from said chamber through the openings of said distributor tube.

4. A centrifugal separator, comprising in combination, a revoluble separating bowl, means for driving said bowl, a plurality of discharge ports formed in the periphery of said bowl, centrifugal port valves operable to open and close said ports, a pack of frusto-conical disks disposed within said bowl in spaced superposed relationship and having center holes in axial alinement to form a cylindrical space, a distributor tube projecting into said space, a plurality of circumferentially spaced vertically extending outlets formed in said distributor tube, means for supplying liquid to be separated and washing liquid to said distributor tube, a distributor chamber formed in said distributor tube, said chamber having a plurality of openings in communication with said disk pack, a resilient valve means associated with said openings for regulating the discharge therethrough, said resilient valve means being centrifugally operable to open and close said openings and arranged to block the flow of liquid from said distributor chamber thereby diverting the liquid through the outlets of said distributor tube.

5. A centrifugal separator comprising in combination, a revoluble separating bowl, means for driving said bowl, a plurality of discharge ports in said bowl, centrifugal resilient port valves operable to open and close said ports, a pack of frusto-conical disks disposed within said bowl, said disks being provided with center holes and eccentric openings in axial alinement, said center holes providing a cylindrical space, a distributor tube positioned within said space, openings formed in said distributor tube for supplying washing liquid throughout the inner peripheries of said disks, means for supplying washing liquid to said distributor tube, a distributor chamber formed in said distributor tube, said chamber having a plurality of openings in communication with said eccentric openings, and resilient centrifugal valve means operable to open said openings during the separating operation at a predetermined speed of rotation of said bowl, and to close said openings during a predetermined lower speed of rotation of the bowl for blocking the flow of washing liquid from said distributor chamber thereby diverting the liquid through the openings of the distributor.

6. A centrifugal separator comprising a revoluble bowl, a pack of frusto-conical separating disks disposed within the bowl in superposed relation, said disks having center openings, the peripheral edges of which are in axial alinement thereby forming a cylindrical space extending axially of the bowl, a distributor chamber at the lower end of said cylindrical space, said chamber having openings for delivering liquid to said separating disks, means for delivering liquid to said distributor chamber, and centrifugal valve means operable by centrifugal force to block the flow of liquid through said chamber during one speed of rotation of the bowl, whereby a column of liquid is built up within the cylindrical space and is distributed radially outwardly between said separating disks.

7. A centrifugal separator comprising a revoluble bowl, a pack of frusto-conical separating disks disposed within the bowl in superposed relation, said disks having center openings, the peripheral edges of which are in axial alinement thereby forming a cylindrical space extending axially of the bowl, a distributor tube positioned within the cylindrical space, said tube having a plurality of discharge outlets, a distributor chamber below said distributor tube, said distributor chamber having openings for delivering liquid to said separating disks, means for delivering washing liquid to said chamber, and centrifugal valve means for regulating said openings, said valve means being operable by centrifugal force to block the flow of liquid through said chamber during one speed of rotation of the bowl whereby a column of washing liquid is built up within the distributor tube and is distributed radially outwardly through said discharge outlets for cleaning and flushing the interior of said bowl.

8. A centrifugal separator comprising a revoluble bowl, a pack of frusto-conical separating disks disposed within the bowl in superposed relation, said disks having center openings, the peripheral edges of which are in axial alinement thereby forming a cylindrical space extending axially of the bowl, a distributor chamber at the lower end of said cylindrical space, said chamber having openings for delivering liquid to said separating disks, means for delivering liquid to said distributor chamber, and spring valve means operable to block the flow of liquid through said chamber during one speed of rotation of the bowl, whereby a column of liquid is built up within the cylindrical space and is distributed radially outwardly between said separating disks.

9. A centrifugal separator comprising a revoluble bowl, a pack of frusto-conical separating disks disposed within the bowl in superposed relation, said disks having center openings, the peripheral edges of which are in axial alinement thereby forming a cylindrical space extending axially of the bowl, a distributor tube mounted within the cylindrical space for rotation with said bowl, said tube having a plurality of discharge outlets, a distributor chamber below said distributor tube, said distributor chamber having openings for delivering liquid to said separating disks, means for delivering washing liquid to said chamber, and centrifugal valve means for regulating said openings, said valve means being operable by centrifugal force to block the flow of liquid through said chamber during one speed of rotation of the bowl whereby a column of washing liquid is built up within the distributor tube and is distributed radially outwardly through said discharge outlets for cleaning and flushing the interior of said bowl.

HILMOND O. VOGEL.

REFERENCES CITED

The following references are of record in the file of this patent:

UNITED STATES PATENTS

| Number | Name | Date |
|---|---|---|
| 528,690 | Ponten et al. | Nov. 6, 1894 |
| 802,724 | Adams | Oct. 24, 1905 |
| 1,751,982 | Dunham | Mar. 25, 1930 |
| 2,173,579 | Fawcett | Sept. 19, 1939 |
| 2,173,580 | Fawcett | Sept. 19, 1939 |
| 2,256,316 | Eddy | Sept. 16, 1941 |

FOREIGN PATENTS

| Number | Country | Date |
|---|---|---|
| 23,115 | Great Britain | Nov. 11, 1912 |
| 17,755 | Sweden | Feb. 16, 1903 |